(12) United States Patent
DuBose et al.

(10) Patent No.: US 7,795,760 B2
(45) Date of Patent: Sep. 14, 2010

(54) LOAD CONDITION CONTROLLED POWER MODULE

(75) Inventors: Richard G. DuBose, Scottsdale, AZ (US); Walter Thornton, Phoenix, AZ (US)

(73) Assignee: iGo, Inc., Scottsdale, AZ (US)

( * ) Notice: Subject to any disclaimer, the term of this patent is extended or adjusted under 35 U.S.C. 154(b) by 255 days.

(21) Appl. No.: 12/180,410

(22) Filed: Jul. 25, 2008

(65) Prior Publication Data

US 2010/0019583 A1    Jan. 28, 2010

(51) Int. Cl.
*H01H 3/42*    (2006.01)
(52) U.S. Cl. .................................................. 307/126
(58) Field of Classification Search ............. 307/31–41, 307/126; 340/3.1, 500, 540, 657
See application file for complete search history.

(56) References Cited

U.S. PATENT DOCUMENTS

| | | | |
|---|---|---|---|
| 3,444,362 A | 5/1969 | Perlman | |
| 3,678,416 A | 7/1972 | Burwen | |
| 3,753,159 A | 8/1973 | Burwen | |
| 4,659,979 A | 4/1987 | Burnham | |
| 4,675,537 A | 6/1987 | Mione | |
| 4,731,549 A | 3/1988 | Hiddelson | |
| 4,874,962 A | 10/1989 | Hermans | |
| 4,970,623 A | 11/1990 | Pintar | |
| 5,017,844 A | 5/1991 | Lendaro | |
| 5,063,164 A | 11/1991 | Goldstein | |
| 5,414,475 A | 5/1995 | Trzyna et al. | |
| 5,455,487 A | 10/1995 | Mix et al. | |
| 5,457,595 A | 10/1995 | Baldwin | |
| 5,541,457 A | 7/1996 | Morrow | |
| 5,579,201 A | 11/1996 | Karageozian | |
| 5,598,042 A | 1/1997 | Mix et al. | |
| 5,615,107 A | 3/1997 | DeAngelis | |

(Continued)

FOREIGN PATENT DOCUMENTS

EP        588173        3/1994

(Continued)

OTHER PUBLICATIONS

PCT/GB2006/001204, International Preliminary Report on Patentability.

(Continued)

*Primary Examiner*—Albert W Paladini
(74) *Attorney, Agent, or Firm*—Snell & Wilmer LLP (57) ABSTRACT

In accordance with various aspects of the present invention, a method and circuit for reducing power consumption of a power module during idle conditions is provided. In an exemplary embodiment, a power module is configured for reducing power during idle mode by disengaging at least one power output from a power input. A power module may include one or more power outputs and one or more power module circuits, with power input connected to the power outputs through the power module circuit(s). The power module circuit may include a current measuring system, a control circuit, and a switch. The current measuring system provides an output power level signal that is proportional to the load at the power output. If current measuring system behavior indicates that a power output is drawing substantially no power from the power input, the switch disengages the power input from the power output.

20 Claims, 4 Drawing Sheets

U.S. PATENT DOCUMENTS

| | | | |
|---|---|---|---|
| 5,699,051 A * | 12/1997 | Billig et al. | 340/657 |
| 5,731,947 A * | 3/1998 | Hirose | 361/160 |
| RE36,098 E | 2/1999 | Vinciarelli | |
| 5,923,103 A | 7/1999 | Pulizzi et al. | |
| 5,990,405 A | 11/1999 | Auten et al. | |
| 5,995,384 A | 11/1999 | Majid et al. | |
| 5,999,417 A | 12/1999 | Schlecht | |
| 6,333,862 B1 | 12/2001 | Lee | |
| 6,396,166 B1 | 5/2002 | Kim | |
| 6,498,466 B1 | 12/2002 | Edwards | |
| 6,501,195 B1 | 12/2002 | Barton | |
| 6,509,658 B1 | 1/2003 | Kim | |
| 6,528,902 B1 | 3/2003 | Barton | |
| 6,586,849 B2 * | 7/2003 | Tarr | 307/38 |
| 6,670,597 B1 | 12/2003 | Kitamura | |
| 6,738,914 B2 | 5/2004 | Christopher | |
| 6,754,092 B2 | 6/2004 | McDowell et al. | |
| 6,759,762 B2 | 7/2004 | Barton | |
| 6,759,763 B2 * | 7/2004 | Barton | 307/39 |
| 6,781,356 B1 | 8/2004 | Yang et al. | |
| 6,811,444 B2 | 11/2004 | Geyer | |
| 6,853,173 B2 | 2/2005 | Caine et al. | |
| 6,917,506 B2 | 7/2005 | Chou | |
| 6,940,272 B2 | 9/2005 | Niv | |
| 6,995,807 B2 | 2/2006 | Libera | |
| 7,027,300 B2 | 4/2006 | Lord | |
| 7,132,763 B2 * | 11/2006 | Rendic | 307/31 |
| 7,141,891 B2 * | 11/2006 | McNally et al. | 307/39 |
| 7,193,335 B2 * | 3/2007 | Palmer et al. | 307/39 |
| 7,285,874 B2 | 10/2007 | Menas et al. | |
| 7,332,834 B2 | 2/2008 | Lee | |
| 7,444,530 B2 | 10/2008 | Deppe et al. | |
| 2002/0135474 A1 | 9/2002 | Sylliassen | |
| 2003/0042879 A1 | 3/2003 | Huh et al. | |
| 2004/0037019 A1 | 2/2004 | Yokozawa | |
| 2004/0070299 A1 | 4/2004 | Cyr | |
| 2004/0105285 A1 | 6/2004 | Tanaka et al. | |
| 2004/0132407 A1 | 7/2004 | Hein-Magnussen et al. | |
| 2004/0257054 A1 | 12/2004 | Balakrishnan et al. | |
| 2005/0041360 A1 | 2/2005 | Dettweiler | |
| 2005/0099164 A1 | 5/2005 | Yang | |
| 2005/0207189 A1 | 9/2005 | Chen | |
| 2006/0098462 A1 | 5/2006 | Usui | |
| 2006/0271800 A1 | 11/2006 | Li et al. | |
| 2006/0273764 A1 | 12/2006 | Huang | |
| 2007/0038334 A1 | 2/2007 | Chou | |
| 2007/0115696 A1 | 5/2007 | Berghegger | |
| 2007/0145946 A1 | 6/2007 | Chiang et al. | |
| 2007/0236180 A1 | 10/2007 | Rodgers | |
| 2007/0262646 A1 | 11/2007 | Lee | |
| 2008/0012533 A1 | 1/2008 | Guang et al. | |
| 2008/0042622 A1 | 2/2008 | Wong et al. | |
| 2008/0049452 A1 | 2/2008 | Van Bodegraven | |
| 2008/0106148 A1 | 5/2008 | Gelonese | |
| 2008/0261453 A1 | 10/2008 | Chen | |
| 2008/0278975 A1 | 11/2008 | Degan et al. | |
| 2009/0121894 A1 | 5/2009 | Wilson et al. | |
| 2009/0224603 A1 | 9/2009 | Perper et al. | |
| 2009/0235107 A1 | 9/2009 | Gelonese | |

FOREIGN PATENT DOCUMENTS

| | | |
|---|---|---|
| JP | 2001136661 | 5/2001 |
| KR | 10-0436114 | 4/2002 |
| KR | 10-2002-0030869 | 4/2004 |
| WO | WO2005076416 | 8/2005 |
| WO | 2006/106310 | 10/2006 |
| WO | WO2007135429 | 11/2007 |
| WO | WO2008037428 | 3/2008 |

OTHER PUBLICATIONS

PCT International Search Report and Written Opinion, issued Jan. 20, 2010, PCT/US2009/046761, 13 pages.

International Search Report and Written Opinion, dated Feb. 17, 2010.

PCT International Search Report and Written Opinion issued Aug. 4, 2009, PCT/US2009/039549, 11 pages.

* cited by examiner

LOAD CONDITION CONTROLLED POWER MODULE

FIELD OF INVENTION

The present invention relates to reducing power consumption in electronic devices. More particularly, the present invention relates to a circuit and method for reducing power consumption by disengaging a power output from a power input using a power module when idle load conditions are present at the power output.

BACKGROUND OF THE INVENTION

The increasing demand for lower power consumption and environmentally friendly consumer devices has resulted in interest in power supply circuits with "green" technology. For example, on average, a notebook power adapter continuously "plugged in" spends 67% of its time in idle mode. Even with a power adapter which conforms to the regulatory requirement of dissipating less than 0.5 watts/hour, this extended idle time adds up to 3000 watt-hours of wasted energy each year per adapter. When calculating the wasted energy of the numerous idle power adapters, the power lost is considerable. In addition to power adapters, numerous electronic devices spend a substantial amount of time plugged-in but not operating. An opportunity exists for reducing the power lost by these electronic devices.

SUMMARY OF THE INVENTION

In accordance with various aspects of the present invention, a method and circuit for reducing power consumption at a power output during idle conditions is provided. In an exemplary embodiment, a load condition controlled power module is configured for reducing or eliminating power during idle mode by disengaging at least one power output from a power input. A power module may be connected to one or more power outputs, and a power input which may provide alternating current (AC) to the one or more power outputs. The power module may include a current measuring system, a control circuit, and a switch. The current measuring system provides an output power level signal that is proportional to the load at the power output. In an exemplary embodiment, if behavior of the current measuring system indicates that at least one power output is drawing substantially no power from the AC power input, the switch facilitates disengaging of the power input from such power output.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF EXEMPLARY EMBODIMENTS OF THE INVENTION

The present invention may be described herein in terms of various functional components and various processing steps. It should be appreciated that such functional components may be realized by any number of hardware or structural components configured to perform the specified functions. For example, the present invention may employ various integrated components, such as buffers, current mirrors, and logic devices comprised of various electrical devices, e.g., resistors, relays, transistors, capacitors, diodes and the like, whose values may be suitably configured for various intended purposes. In addition, the present invention may be practiced in any integrated circuit application. However for purposes of illustration only, exemplary embodiments of the present invention will be described herein in connection with a sensing and control system and method for use with a power module. Further, it should be noted that while various components may be suitably coupled or connected to other components within exemplary circuits, such connections and couplings can be realized by direct connection between components, or by connection through other components and devices located thereinbetween.

Various embodiments are possible of a power module configured for reducing or eliminating power during idle mode. In an exemplary embodiment, a circuit for implementing the power module is integrated into or otherwise a part of a larger device and controls power input to the larger device based on various load conditions. In another exemplary embodiment, the power module is a component that could be removable or fixed as part of an electronic device. The power module may be a printed circuit board, a potted block, an integrated circuit, a MEMS device, or any other structure configured for implementation in a larger device or system. In another exemplary embodiment, the power module may be within a housing configured to facilitate simple installation of the power module. This embodiment may be added to existing electrical devices.

In accordance with various aspects of the present invention, a power module configured for reducing or eliminating power during idle mode by disengaging a power input is disclosed. In an exemplary embodiment, and with reference to FIG. 1, a power module 100 comprises a power input 110, a power output 120 and a power module circuit 130. Accordingly, power module 100 can comprise any configuration of system where a power input is received, power is provided at a power output, and a circuit disengages the power provided to the power output in order to reduce power consumption.

Figure 1:
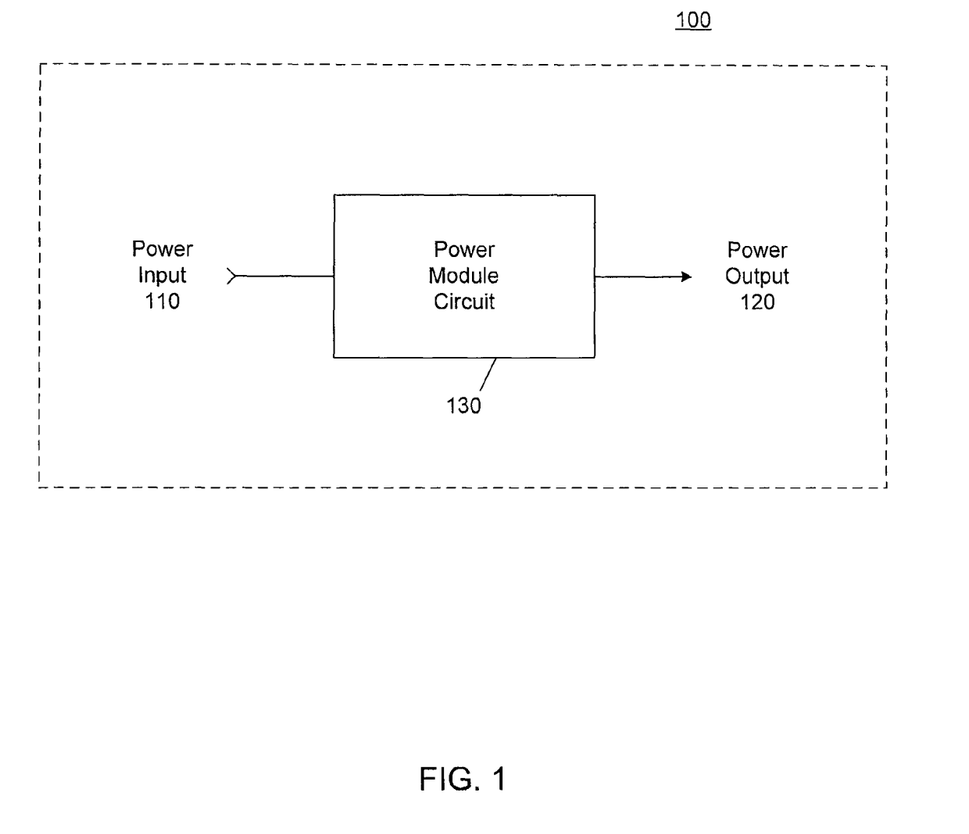
FIG. 1 illustrates a block diagram of an exemplary load condition controlled power module in accordance with an exemplary embodiment.

In an exemplary embodiment, power input 110 and power output 120 are 3-pin or 2-pin plugs or receptacles. In another exemplary embodiment, power input 110 and power output 120 comprise flying leads for connection to various electrical components. Other connections may be made by terminal strips, spade connectors, or fixed connectors mounted on a printed circuit board. However, power input 110 and power output 120 can be suitably configured in any other input and/or output configuration. Furthermore, power input 110 may be connected to a 110 volt or 220 volt power source in an exemplary embodiment.

Figure 2:
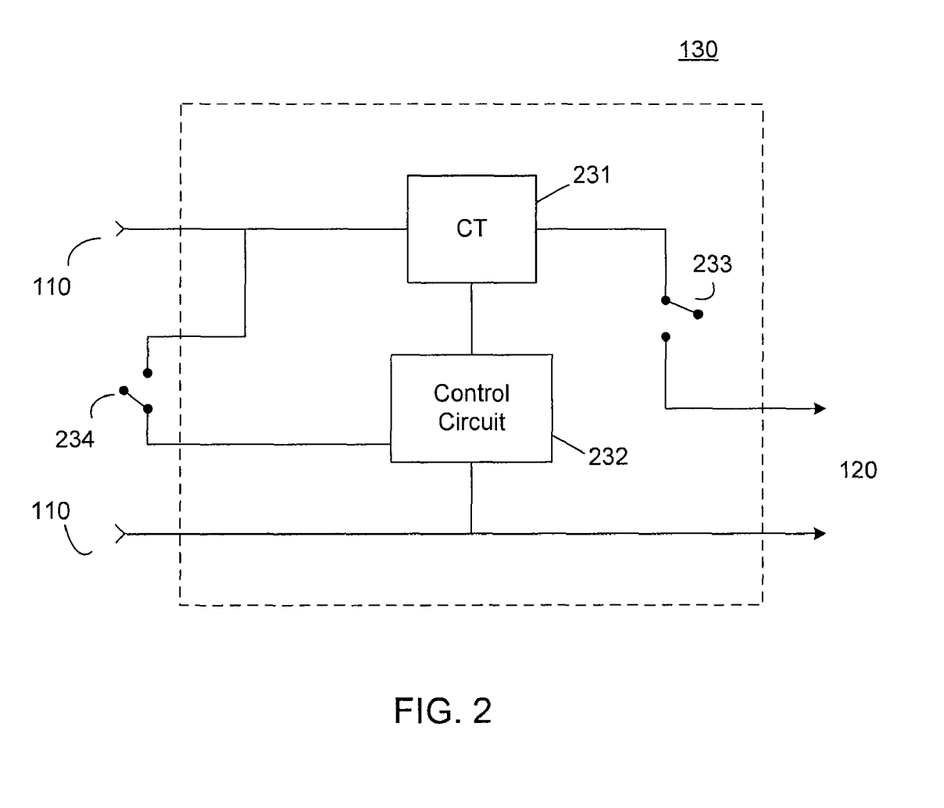
FIG. 2 illustrates a block diagram of an exemplary load condition controlled power module in accordance with an exemplary embodiment.

In an exemplary embodiment, and with reference to FIG. 2, power module 100 comprises power input 110 communicatively coupled to power module circuit 130, which in turn is communicatively coupled to power output 120. Power output 120 may also be connected or otherwise coupled to a ground line and a neutral line in one embodiment. The power module circuit 130 comprises a current measuring system 231, a control circuit 232, and a switch 233. In an exemplary embodiment and for illustration purposes, current measuring system 231 comprises a current transformer 231 having a primary circuit and a secondary winding. However, current measuring system 231 may also comprise a resistor with a differential amplifier, a current sensing chip, a Hall-effect device, or any other suitable component configured to measure current as now known or hereinafter devised. Current transformer 231 provides an output power level signal that is proportional to the load at power output 120. Furthermore, switch 233 connects the primary circuit of current transformer 231 to power output 120.

In an exemplary embodiment, control circuit 232 may comprise at least one of, or a combination of: a latching circuit, a state machine, and a microprocessor. In one embodiment, control circuit 232 monitors the condition of the secondary winding of current transformer 231 and controls the operation of switch 233. Furthermore, in an exemplary embodiment, control circuit 232 receives a low frequency or DC signal from current transformer 231. The low frequency signal, for example, may be 60 Hz. This low frequency or DC signal is interpreted by control circuit 232 as the current required by the load at power output 120.

Control circuit 232 can comprise various structures for monitoring the condition of the secondary winding of current transformer 231 and controlling the operation of switch 233. In an exemplary embodiment, with reference to FIG. 3, control circuit 232 includes a current sensor 301 and a logic control unit 302. Current sensor 301 monitors the output of a current measuring system, such as for example, the secondary winding of current transformer 231, which is an AC voltage proportional to the load current. Also, current sensor 301 provides a signal to logic control unit 302. In one embodiment, the signal may be a DC voltage proportional to the current monitored by current sensor 301. In another embodiment, the signal may be a current proportional to the current monitored by current sensor 301.

Figure 3:
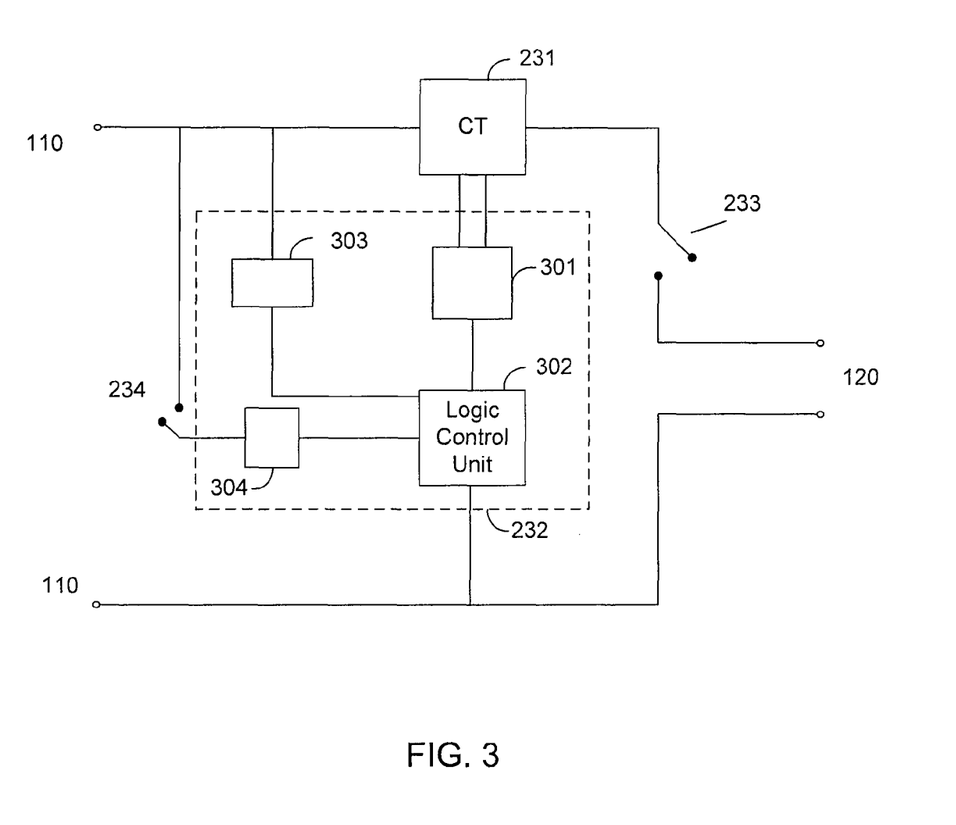
FIG. 3 illustrates a block diagram of an exemplary load condition controlled power module in accordance with an exemplary embodiment.

In an exemplary embodiment, logic control unit 302 is powered by an energy storage capacitor. Logic control unit 302 may briefly connect the storage capacitor to power input 110 in order to continue powering logic control unit 302. In another embodiment, logic control unit 302 may be powered by a battery or other energy source. This energy source is also referred to as housekeeping or hotel power; it functions as a low auxiliary power source. In one embodiment, auxiliary power is taken from power input 110. For further detail on similar current monitoring, see U.S. Provisional Application 61/052,939, hereby incorporated by reference.

In an exemplary embodiment, logic control unit 302 is a microprocessor capable of being programmed prior to, and after integration of power module 100 in an electronic device. In one embodiment, a user is able to connect to logic control unit 302 and customize the parameters of power module 100. For example, a user may set the threshold level and a sleep mode duty cycle of power module 100. Data from power module 100 could be transmitted regarding, for example, the historical power consumption and/or energy saved. The bidirectional data transfer between power module 100 and a display device may be achieved through a wireless signal, such as for example, an infra-red signal, a radio frequency signal, or other similar signal. The data transfer may also be achieved using a wired connection, such as for example, a USB connection or other similar connection.

In accordance with an exemplary embodiment, control circuit 232 may further comprise a power disconnect 303 in communication with logic control unit 302. Power disconnect 303 is configured to isolate logic control unit 302 from power input 110 and reduce power loss. While isolated, logic control unit 302 is powered by the storage capacitor or other energy source and logic control unit 302 enters a sleep mode. If the storage capacitor reaches a low power level, power disconnect 303 is configured to reconnect logic control unit 302 to power input 110 to recharge the storage capacitor. In an exemplary embodiment, power disconnect 303 is able to reduce the power loss from a range of microamperes of leakage current to a range of nanoamperes of leakage current.

In another exemplary embodiment, control circuit 232 receives a control signal that is impressed upon power input 110 by another controller. The control signal may be, for example, the X10 control protocol or other similar protocol. Control circuit 232 may receive the control signal through the secondary winding of current transformer 231, from a coupled power input 110, or any other suitable means configured to couple power input 110 to control circuit 232 as now known or hereinafter devised. This control signal may come from within power module 100 or may come from an external controller. The control signal may be a high frequency control signal or at least a control signal at a frequency different than the frequency of power input 110. In an exemplary embodiment, control circuit 232 interprets the high frequency control signal to engage or disengage switch 233. In another embodiment, an external controller may transmit a signal to turn power module 100 to an "on" or "off" condition.

In an exemplary embodiment, if behavior of the secondary winding of current transformer 231 indicates that power output 120 is drawing substantially no power from power input 110, switch 233 facilitates or controls disengaging of the primary circuit of current transformer 231 from power output 120, i.e., switch 233 facilitates the disengaging of a power source from power outlet 120. In an exemplary embodiment, the secondary winding of current transformer 231 is monitored for an AC waveform at the AC line frequency of power input 110, where the AC waveform has an RMS voltage proportional to the load current passing through the primary circuit of current transformer 231 to power output 120. In another embodiment, the AC waveform is rectified and filtered to generate a DC signal before being received by control circuit 232. The DC signal is proportional to the load current passing through the primary circuit of current transformer 231 to power output 120.

In one embodiment, the phrase "substantially no power" is intended to convey that the output power is in the range of approximately 0-1% of a typical maximum output load. In an exemplary embodiment, switch 233 is configured to control the connection of the primary circuit of current transformer 231 to power output 120 and comprises a switching mechanism to substantially disengage the primary circuit of current transformer 231 from power output 120. Switch 233 may comprise at least one of a relay, latching relay, a TRIAC, and an optically isolated TRIAC.

By substantially disabling the primary circuit of current transformer 231, the power consumption at power output 120 is reduced. In one embodiment, substantially disabling power output 120 is intended to convey that the output signal of the secondary winding of current transformer 231 has been interpreted by control circuit 232 as sufficiently low so that it is appropriate to disengage switch 233 and remove power from power output 120.

In another exemplary embodiment, and with reference to FIGS. 2 and 3, power module circuit 130 further comprises a reconnection device 234, which is configured to enable the closure of switch 233 through logic control unit 302. The closure of switch 233 reconnects power output 120 to the primary circuit of current transformer 231 and power input 110. In an exemplary embodiment, reconnection device 234 comprises a switch device that may be closed and opened in various manners. For example, reconnection device 234 can comprise a push button that may be manually operated. In one embodiment, the push button is located on the face of power module 100. In another embodiment, reconnection device 234 is affected remotely by signals traveling through power input 110 that control circuit 232 interprets as on/off control. In yet another embodiment, reconnection device 234 is controlled by a wireless signal, such as for example, an infra-red signal, a radio frequency signal, or other similar signal.

Figure 4:
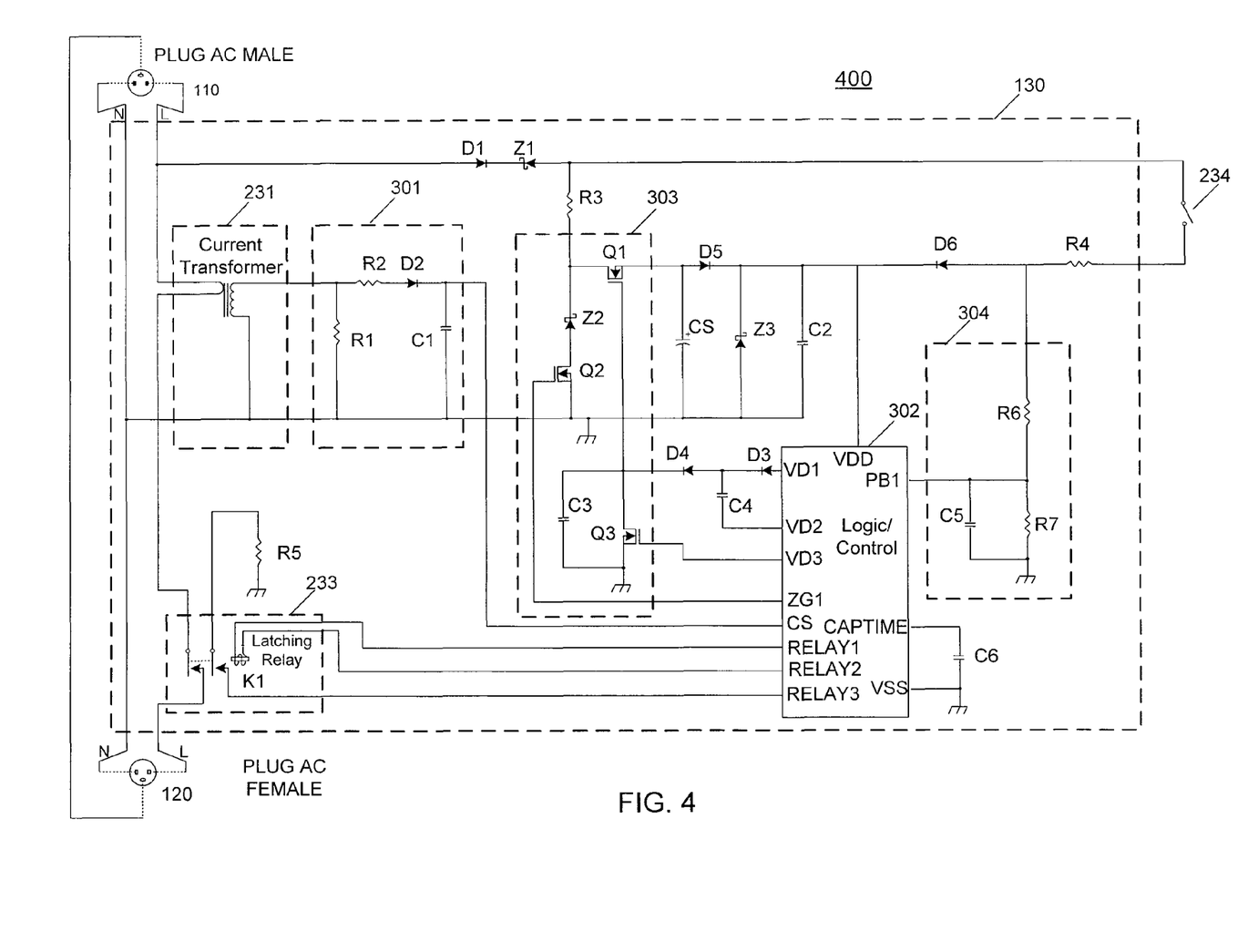
FIG. 4 illustrates a circuit diagram of an exemplary control circuit for use within an exemplary load condition controlled power module in accordance with an exemplary embodiment.

In an exemplary embodiment, and with reference to FIGS. 3 and 4, power module circuit 130 further comprises a reconnection device memory state 304. Reconnection device memory state 304 is configured to indicate whether reconnection device 234 was recently activated so that logic control unit 302 can determine the circuit conditions upon power up. In the exemplary embodiment, reconnection device memory state 304 comprises a capacitor C5, which charges when reconnection device 234 is activated. Logic control unit 302 can then measure the voltage on capacitor C5 as an indication of whether reconnection device 234 was activated. In one exemplary embodiment, reconnection device memory state 304 provides a digital reading to the PB1 input of logic control unit 302. If there is sufficient voltage at capacitor C5, the PB1 input reads a "1". If there is insufficient voltage at capacitor C5, the PB1 input reads a "0". The determination of what voltage is sufficient is dependent in part on the ratio of resistors R6 and R7 and can be interpreted by logic control unit 302, as would be known to one skilled in the art. Capacitor C5 serves to store the state of reconnection device 234 until the voltage of capacitor C5 can be read by logic control unit 302.

In accordance with another exemplary embodiment, switch 233 is automatically operated on a periodic basis. For example, switch 233 may automatically reconnect after a few or several minutes or tens of minutes, or any period more or less frequent. In one embodiment, switch 233 is automatically reconnected frequently enough that a battery operated device connected to power module 100 will not completely discharge internal batteries during a period of no power at the input to the connected device. After power output 120 is reconnected, in an exemplary embodiment, power module circuit 130 tests for or otherwise assesses load conditions, such as the power demand at power output 120. If the load condition on power output 120 is increased above previously measured levels, power output 120 will remain connected to the primary circuit of current transformer 231 until the load condition has returned to a selected or predetermined threshold level indicative of a "low load". In other words, if the power demand at power output 120 increases, power is provided to power output 120 until the power demand drops and indicates a defined idle mode. In an exemplary embodiment, the determination of load conditions at re-connect are made after a selected time period had elapsed, for example after a number of seconds or minutes, so that current inrush or initialization events are ignored. In another embodiment, the load conditions may be averaged over a selected time period of a few seconds or minutes so that short bursts of high load average out. In yet another exemplary embodiment, power module 100 comprises a master reconnection device that can re-engage all power outputs 120 to power input 110.

In an exemplary method of operation, power module 100 has switch 233 closed upon initial power-up, such that power flows to power output 120. When load conditions at power output 120 are below a threshold level, control circuit 232 opens switch 233 to create an open circuit and disengage power output 120 from the input power signal. This disengaging effectively eliminates any idle power lost by power output 120. In one embodiment, the threshold level is a predetermined level, for example approximately one watt of power or less flowing to power output 120.

In an exemplary embodiment, different power outputs 120 may have different fixed threshold levels such that devices having a higher power level in idle may be usefully connected to power module 100 for power management. For example, a large device may still draw about 5 watts during idle, but would never be disconnected from power input 110 if the connected power output 120 had a threshold level of about 1 watt. In various embodiments, certain power outputs 120 may have a higher threshold levels to accommodate high power devices, or lower threshold levels for lower power devices.

In another embodiment, the threshold level is a learned level. The learned level may be established through long term monitoring by control circuit 232 of load conditions at power output 120. A history of power levels is created over time by monitoring and may serve as a template of power demand. In an exemplary embodiment, control circuit 232 examines the history of power levels and decides whether long periods of low power demand were times when a device connected at power output 120 was in a low, or lowest, power mode. In an exemplary embodiment, control circuit 232 disengages power output 120 during low power usage times when the period of low power matches the template. For example, the template might demonstrate that the device draws power through power output 120 for eight hours, followed by sixteen hours of low power demand.

In another exemplary embodiment, control circuit 232 determines the approximate low power level of the electronic device connected at power output 120, and sets a threshold level to be a percentage of the determined approximate low power level. For example, control circuit 232 may set the threshold level to be about 100-105% of the approximate low power level demand. In another embodiment, the threshold demand may be set at about 100-110% or 110-120% or more of the approximate low level power demand. In addition, the low power level percentage range may be any variation or combination of the disclosed ranges.

Having disclosed various functions and structures for an exemplary power module configured for reducing or eliminating power during idle mode by disengaging power input, a detailed schematic diagram of an exemplary power module 400 can be provided in accordance with an exemplary embodiment of the present invention. With reference to FIG. 4, in an exemplary embodiment of power module 400, power module circuit 130 comprises current transformer 231, current sensor 301, logic control unit 302, power disconnect 303, reconnection device memory state 304, and switch 233.

In one embodiment, current transformer 231 and current sensor 301 combine to measure the current from power input 110 and convert said current to a proportional DC voltage that can be read by logic control unit 302. Furthermore, switch 233 may comprise a latching relay, e.g., relay coil K1, that provides a hard connect/disconnect of power input 110 to power output 120 after a command from logic control unit 302. Switch 233 alternates between open and closed contacts. Furthermore, switch 233 holds its position until reset by logic control unit 302, and will hold position without consuming any power in a relay coil K1.

In an exemplary embodiment, logic control unit 302 comprises a microcontroller that receives input of the current in the power input line, controls the state of switch 233 and reads or otherwise assesses the state or position of the contacts of reconnection device 234 and switch 233. In addition, logic control unit 302 learns and stores the power profile for an electronic device connected to power output 120. In another exemplary embodiment, power module circuit 130 further comprises reconnection device 234 and reconnection device memory state 304. Reconnection device 234 is activated to turn on power output 120 when power module circuit 130 is first connected to power input 110 or when full power is needed immediately at power output 120. Reconnection device memory state 304 is configured to indicate to logic control unit 302 whether reconnection device 234 was recently activated.

In an exemplary embodiment, power disconnect 303 comprises a network of transistors Q1, Q2, Q3 which are used in conjunction with zener diodes Z1, Z2 to condition power input 110 to a safe level suitable for logic control unit 302 and isolate logic control unit 302 from power input 110. In another embodiment, power disconnect 303 comprises relays in addition to, or in place of, the transistors of the prior embodiment.

Initial connection of power module 400 involves connecting power module 400 to a power source, which may be AC or DC. In an exemplary method, upon initial plug-in of power module 400 to a power source, all circuits of power module circuit 130 are dead and switch 233 is in the last position or state set by logic control unit 302. This initial condition may or may not provide power to power output 120. When all the circuits are dead, there is no current flow into power module circuit 130. This is due to the isolation provided by power disconnect 303 and reconnection device 234 in a normal, open position. In an exemplary embodiment, power disconnect 303 comprises transistors Q1, Q2, Q3 and capacitor C3. In this state, only leakage current will flow through transistors Q1, Q2 and the leakage current will be on the order of approximately tens of nanoamperes. Furthermore, current transformer 231 provides dielectric isolation from primary side to secondary side so that only small leakage current flows due to the inter-winding capacitance of current transformer 231.

With continued reference to FIG. 4, in an exemplary embodiment and for illustration purposes, a user may reconnect the circuit using reconnection device 234 to establish a current path through diode D1, zener diode Z1, reconnection device 234, resistor R4, diode D6, and zener diode Z3. Diode D1 serves to half-wave rectify the AC line to drop the peak to peak voltage in half. Zener diode Z1 further reduces the voltage from diode D1, for example to about 20 volts. Zener diode Z3 and resistor R4 form a current limited zener regulator that provides an appropriate DC voltage at the VDD input to logic control unit 302 while reconnection device 234 is held. In addition, capacitor C2 smoothes the DC signal on zener diode Z3 and provides storage during the contact bounce of reconnection device 234. Capacitor C2 is sized to provide sufficient storage during the start-up time of logic control unit 302, and capacitor C2 in combination with resistor R4 provides a fast rising edge on the VDD input to properly reset logic control unit 302. Furthermore, diode D5 isolates capacitor C2 from capacitor CS so the rise time constant of capacitor C2 and resistor R4 is not affected by the large capacitance of capacitor CS. When capacitor CS is powering logic control unit 302, the current of capacitor CS passes through diode D5. Diode D6 serves to isolate the voltage on capacitor C2 when reconnection device 234 is released. This allows the voltage stored on capacitor C5 during the closed time of reconnection device 234 to be retained when reconnection device 234 is open and inform logic control unit 302 of the open condition.

In an exemplary method, if reconnection device 234 is activated for a few milliseconds, logic control unit 302 is configured to initialize and immediately set up to provide its own power before reconnection device 234 is released. This is accomplished from voltage doubler outputs VD1-VD3 and ZG1 of logic control unit 302. First, output ZG1 is driven high to turn on transistor Q2. With transistor Q2 on, a current path is established through resistor R3 and zener diode Z2 providing a regulated voltage at the drain of transistor Q1. This regulated voltage is similar to that produced by zener diode Z3 and is appropriate for the VDD input of logic control unit 302. Second, after the voltage on zener diode Z2 has stabilized for a few microseconds, outputs VD1-VD3 of logic control unit 302 begin switching to produce a gate drive signal to turn on transistor Q1. The signals produced by outputs VD1-VD3 and components including capacitor C3, transistor Q3, capacitor C4, diode D3 and diode D4 produce a voltage at the gate of transistor Q1 that is about twice the voltage on VDD input of logic control unit 302. This voltage doubling turns transistor Q1 on hard. Once transistor Q1 is on, the voltage at zener diode Z2 charges capacitor CS. In an exemplary embodiment, capacitor CS is a large storage capacitor that is used to power logic control unit 302 when reconnection device 234 is not being activated. After capacitor CS has been charged for a few milliseconds, outputs VD1-VD3 and ZG1 return to a rest state and transistors Q1 and Q2 are turned off. In this embodiment, logic control unit 302 is operating off the stored charge in capacitor CS and not drawing power from power input 110. When reconnection device 234 is no longer active, capacitor CS will continue to power logic control unit 302.

If power output 120 is idling and drawing substantially no power, logic control unit 302 may be able to disengage from drawing power and enter a "sleep" mode. In an exemplary method, and with further reference to FIG. 4, when logic control unit 302 is operating from the stored energy in capacitor CS, a timing function is enabled in logic control unit 302 that uses capacitor C6 to perform the timing function. Capacitor C6 is briefly charged by the CAPTIME output of logic control unit 302 and over time capacitor C6 discharge rate will mimic the decay of the voltage on capacitor CS. Once capacitor C6 voltage at input CAPTIME reaches a low level, logic control unit 302 will set the state of outputs VD1-VD3 and ZG1 to again recharge capacitor CS from the AC line. This process repeats over and over so power is never lost to logic control unit 302. The recharge process takes only a few milliseconds or less to operate, depending on the size of capacitor CS.

Furthermore, in an exemplary method, when logic control unit 302 is not busy recharging capacitor CS, switching relay K1, or measuring power drawn from power output 120, logic control unit 302 is operating in a deep sleep mode that stops all, or substantially all, internal activity and waits for capacitor C6 to discharge. This sleep mode consumes very little power and allows the charge on storage capacitor CS to persist for many seconds. If reconnection device 234 is activated during the sleep mode, capacitor C5 will be recharged and logic control unit 302 will resume normal operation and set or reset relay K1. Alternatively, if capacitor C6 voltage falls too low, logic control unit 302 will again recharge capacitor CS and then return to sleep mode.

While an electronic device is in an idle mode, power module 100 may continue to monitor for changes in the power drawn by the electronic device. In an exemplary method, while logic control unit 302 continuously goes in and out of sleep mode to re-power itself, logic control unit 302 will also periodically test the power being drawn from power output

120. The period of power testing is much greater than that of capacitor CS charging and, for example, may be only tested every ten or more minutes. In accordance with an exemplary method, there are at least three possible outcomes from the result of power testing: 1) the device is operating and the switch is not in standby condition, 2) the device is not operating but the switch is not in a standby condition, or 3) the switch is in a standby condition.

For the outcome when the device is operating and the switch is not in a standby condition, relay K1 has been previously set to deliver power to power output 120 and power testing shows an appreciable load current is being drawn by the electronic device connected. An "appreciable load" may be defined by some fixed value programmed into logic control unit 302, or it may be the result of a number of power tests and be the typical load current for this electronic device. A power test result here will be interpreted as normal conditions and logic control unit 302 will go back into sleep mode cycling until another time period, such as ten minutes, has passed when the power test will be made again. In another exemplary embodiment, the duration of the sleep mode cycling is determined by a user. For example, a user may set the sleep mode duration to be one, two, or five minutes and may do so using a dial, a digital input, a push button, keypad or any other suitable means now know or hereinafter devised.

For the outcome when the device is not operating but the switch is not in a standby condition, relay K1 has been previously set to deliver power to power output 120 and power testing shows a negligible load current being drawn by the device connected. The "negligible load" may be some fixed value programmed into logic control unit 302, or it may be the result of a number of power tests and be the typical minimum found for this electronic device. In either case the action taken by logic control unit 302 will be to set relay K1 to an open condition by using outputs RELAY1-RELAY2 of logic control unit 302 to energize relay coil K1. The state of relay K1 is determined by logic control unit 302 testing for the presence of resistor R5 at RELAY3, since logic control unit 302 may not know the previous state of relay K1, for example, starting from power off state.

For the outcome when the switch is in a standby condition, that is, relay K1 has been set to remove power from power output 120, logic control unit 302 must set relay K1 to a closed condition to allow AC power to be applied to the power output. In an exemplary method, once relay K1 is set, a period of time is allowed to elapse before the power testing is done. This delay allows for the electronic device attached to power output 120 to initialize and enter a stable operating mode. Power measurements may now be made over some period of time to determine if the electronic device is in a low or high power state. If a high power state is determined, relay K1 remains set. If a low power state is determined, relay K1 is reset to open condition and power is again removed from power output 120. Also, logic control unit 302 will again begin sleep mode cycling and power testing after a determined time period, for example, every ten minutes.

If a user wants to operate a device that is connected to power output 120 and that power output is turned off, in an exemplary embodiment, activating reconnection device 234 will immediately wake logic control unit 302 from sleep mode. Since the wake up was from the activation of reconnection device 234 and not due to power testing or capacitor CS recharging, logic control unit 302 will immediately set relay K1 to closed position to power the electronic device connected to power output 120.

In addition to the embodiments described above, various other elements may be implemented to enhance control and user experience. One way to enhance user control is to allow a user to select the operating mode of a power output. In an exemplary embodiment, power module 100 further comprises a "Green Mode" switch that enables or disables the "green" mode operation. The green mode switch may be a hard, manual switch or it may be a signal to logic control unit 302. "Green" mode operation is the disengaging of power output 120 from Power input 110 when substantially no load is being drawn at power output 120. A user may use the green mode switch to disenable green mode operation on various power outputs when desired. For instance, this added control may be desirable on power outputs that power devices with clocks or devices that need to be instantly on, such as a fax machine.

In one embodiment, power module 100 includes LED indicators, which may indicate whether a power output is connected to the power line and drawing a load current. The LED indicators may indicate that whether a power output is active, that is, power is drawn by an electronic device and/or the power output has power available even if an electronic device is not connected. In addition, a pulsing LED may be used to show when power testing is being done or to indicate the "heartbeat" of sleep mode recharging.

In another embodiment, power module 100 comprises at least one LCD display. The LCD display may be operated by logic control unit 302 to indicate the load power being provided to power output 120, for example during times of operation. The LCD may also provide information about the power saved or power consumed by operating power module 100 in or out of a "green" mode. For example, LCD may display the sum total of watts saved during a certain time period, such as the life of power module 100 or in a day.

Various embodiments may also be used to enhance the efficient use of the power module and/or individual power outputs in the power module. One such embodiment is the implementation of a photocell or other optical sensor monitored by logic control unit 302. The photocell determines whether light is present in the location of power module 100 and logic control unit 302 can use this determination to disengage power output 120 depending on the ambient light conditions. For example, logic control unit 302 may disengage power output 120 during periods of darkness. In other words, the power outputs of the power module may be turned off at night. Another example is devices do not need power if located in a dark room, such as an unused conference room in an office. Also, the power outputs may be turned off when the ambient light conditions exceed a certain level, which may be predetermined or user determined.

In another embodiment, power module 100 further comprises an internal clock. Logic control unit 302 may use the internal clock to learn which time periods show a high power usage at power output 120. This knowledge may be included to determine when a power output should have power available. In an exemplary embodiment, the internal clock has quartz crystal accuracy. Also, the internal clock does not need to be set to an actual time. Furthermore, the internal clock may be used in combination with the photocell for greater power module efficiency and/or accuracy.

The present invention has been described above with reference to various exemplary embodiments. However, those skilled in the art will recognize that changes and modifications may be made to the exemplary embodiments without departing from the scope of the present invention. For example, the various exemplary embodiments can be implemented with other types of power module circuits in addition to the circuits illustrated above. These alternatives can be suitably selected depending upon the particular application or in consideration of any number of factors associated with the operation of the system. Moreover, these and other changes or modifications are intended to be included within the scope of the present invention, as expressed in the following claims.

The invention claimed is:

1. A power module configured as a component of an electronic device to reduce power consumption during idle operation of the electronic device, said power module comprising:
   a power input of said power module;
   at least one power output of said power module configured to transmit power to the electronic device; and
   a power module circuit configured to receive power from said power input and transmit power to said at least one power output;
   wherein said power module circuit disengages transmitting power to said at least one power output in response to said at least one power output drawing substantially no power.

2. The power module of claim 1, wherein said power module circuit comprises:
   a current measuring system configured to monitor current from said power input, wherein said current measuring system provides an output power level signal that is proportional to a load at said at least one power output;
   a switch in communication with said current measuring system and said at least one power output; and
   a control circuit configured to receive said output power level signal and control the opening and the closing of said switch to disengage said at least one power output from power.

3. The power module of claim 1, further comprising a green mode switch configured to select an operating mode of said at least one power output, wherein said operating mode is at least one of a normal mode and a green mode.

4. The power module of claim 1, further comprising at least one LED indicator configured to indicate if said electronic device connected to said at least one power output is active, and wherein said at least one LED indicator is further configured to flash if said power module circuit is testing said at least one power output.

5. The power module of claim 1, further comprising a liquid crystal display (LCD) configured to display data, wherein said data is at least one of load power provided to said at least one power output, power saved by said at least one power output, power saved by said power module, and power consumed by said power module.

6. The power module of claim 2, further comprising a reconnection device configured to override said control circuit and re-engage said switch to a closed state, and wherein said reconnection device is further configured to disengage said switch to an open state.

7. The power module of 6, wherein said reconnection device is controlled by at least one of an infra-red signal, a radio frequency signal, and a signal received through said power input.

8. The power module of claim 6, wherein said reconnection device is configured to override a single control circuit and re-engage a single switch to a closed state, and wherein said reconnection device is further configured to disengage said single switch to an open state.

9. The power module of claim 1, wherein said substantially no power is approximately 0-1% of a typical maximum output load of said electronic device at said at least one power output.

10. The power module of claim 1, further comprising means for setting the duration of a sleep mode duty cycle.

11. A power module configured for integration into an electronic device to efficiently provide power to the electronic device, said power module comprising:
    at least one power output configured to provide power to said electronic device;
    a switch having at least an open state and a closed state, wherein said switch is in communication with said at least one power output and a power input;
    a current measuring system configured to monitor current drawn by said at least one power output; and
    a control circuit configured to control the state of said switch;
    wherein said control circuit sets said switch to the open state if the current drawn by said at least one power output is below a threshold level, such that said at least one power output is effectively disengaged from said power input.

12. The power module of claim 11, wherein said control circuit tests a load condition at said at least one power output by setting said switch to the closed state and determining if the current drawn by said at least one power output is below the threshold level.

13. The power module of claim 11, wherein said control circuit controls said at least one power output individually.

14. The power module of claim 11, further comprising:
    a current sensor and a logic control unit in said control circuit; and
    a photocell configured to measure a level of ambient light surrounding said power module, wherein said logic control unit is configured to disengage said at least one power output based upon the level of ambient light.

15. The power module of claim 11, wherein said threshold level is a learned level determined by long term monitoring of a load condition at said at least one power output.

16. The power module of claim 11, wherein said threshold level is a percentage of a determined approximate low power level of said electronic device, and wherein said percentage of said determined approximate low power level is at least one range of approximately 100-105%, approximately 100-110%, and approximately 110-120%.

17. The power module of claim 11, wherein said at least one power output comprises a first power output with a first threshold level and a second power output with a second threshold level, wherein said first threshold level is different from said second threshold level.

18. A method of facilitating lower power consumption using a power module configured as a component of an electrical device, the method comprising:
    providing power from said power module to the electronic device at a power output;
    monitoring, with a current measuring system, a load condition at said power output to generate a measured load condition;
    transmitting the measured load condition to a control circuit;
    controlling, with said control circuit, the state of a switch; and
    setting said switch to an open state if the load condition is below a threshold level and effectively disengaging said power output from a power input.

19. The method of claim 18, further comprising:
    overriding said control circuit using a reconnection device to reengage said switch to a closed state.

20. The method of claim 18, further comprising:
    determining said threshold level based upon the monitoring of the load condition at said power output; and
    electrically isolating said control circuit from said power input using a power disconnect.

* * * * *